United States Patent
Pfleger

(10) Patent No.: US 9,353,850 B2
(45) Date of Patent: May 31, 2016

(54) DEVICE FOR PROVIDING THE OIL SUPPLY OF A SECONDARY CIRCUIT OF A TRANSMISSION OF A HYBRID DRIVELINE OF A MOTOR VEHICLE, COMPRISING AN AUXILIARY ELECTRICALLY DRIVEN OIL PUMP

(71) Applicant: ZF Friedrichshafen AG, Friedrichshafen (DE)

(72) Inventor: Tobias Pfleger, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 284 days.

(21) Appl. No.: 13/946,053

(22) Filed: Jul. 19, 2013

(65) Prior Publication Data

US 2014/0048355 A1 Feb. 20, 2014

(30) Foreign Application Priority Data

Aug. 14, 2012 (DE) .......................... 10 2012 214 495

(51) Int. Cl.
  *F16H 57/04* (2010.01)
  *F16H 61/00* (2006.01)

(52) U.S. Cl.
  CPC ........ *F16H 57/0436* (2013.01); *F16H 57/0435* (2013.01); *F16H 57/0446* (2013.01); *F16H 57/0447* (2013.01); *F16H 61/0031* (2013.01); *F16H 2061/0037* (2013.01); *F16H 2200/006* (2013.01); *F16H 2200/0095* (2013.01)

(58) Field of Classification Search
  CPC ................ F16H 2061/0037; F16H 2200/006; F16H 220/095; F16H 57/0435; F16H 57/0436; F16H 57/0446; F16H 57/0447; F16H 61/0031

USPC ............................................. 184/26; 137/511
  See application file for complete search history.

(56) References Cited

U.S. PATENT DOCUMENTS

| 2011/0120568 | A1  | 5/2011  | Borntraeger et al. |
| 2011/0174578 | A1* | 7/2011  | Richard et al. .................. 184/35 |
| 2011/0197982 | A1* | 8/2011  | Moorman et al. ....... 137/565.11 |
| 2011/0297258 | A1* | 12/2011 | Tanaka et al. ............ 137/565.11 |
| 2012/0312396 | A1* | 12/2012 | Hoppe et al. .................. 137/511 |

FOREIGN PATENT DOCUMENTS

DE 10 2008 040 667 A1 1/2010

OTHER PUBLICATIONS

German Office Action Corresponding to 10 2012 214 495.1 mailed Apr. 29, 2013.

* cited by examiner

*Primary Examiner* — William E Dondero
*Assistant Examiner* — Robert T Reese
(74) *Attorney, Agent, or Firm* — Davis & Bujold, PLLC; Michael J. Bujold

(57) ABSTRACT

A device for ensuring the supply of oil to the secondary circuit of a transmission of a hybrid drive-train of a motor vehicle, having an electrically operated auxiliary oil pump, which comprises a bypass valve that is connected between the outlet of the auxiliary oil pump and the secondary circuit of the hybrid circuit of the transmission, such that the valve opens at a predetermined opening pressure, closes at a predetermined closing pressure which is lower than the minimum system pressure, and, at a predetermined pressure between the opening and closing pressures, the valve permits flow a predetermined volume flow into the secondary circuit.

12 Claims, 3 Drawing Sheets

DEVICE FOR PROVIDING THE OIL SUPPLY OF A SECONDARY CIRCUIT OF A TRANSMISSION OF A HYBRID DRIVELINE OF A MOTOR VEHICLE, COMPRISING AN AUXILIARY ELECTRICALLY DRIVEN OIL PUMP

This application claims priority from German patent application serial no. 10 2012 214 495.1 filed Aug. 14, 2012.

FIELD OF THE INVENTION

The present invention relates to a device for ensuring the supply of oil to the secondary circuit of a transmission of a hybrid drive-train of a motor vehicle, which comprises an electrically operated auxiliary oil pump.

BACKGROUND OF THE INVENTION

In a transmission of a hybrid drive-train of a motor vehicle, to ensure the supply of oil when the internal combustion engine is switched off, for example when the vehicle is at rest or during purely electric-powered driving, an electric auxiliary pump is needed. The auxiliary pump ensures that gear-shifts can be carried out during driving under electric power and that the transmission is cooled. As a rule the auxiliary pump is only operated when the main oil pump powered by the internal combustion engine or by some other drive aggregate can no longer ensure the necessary volume flow or oil pressure.

To obtain trouble-free operation of the transmission, it must be ensured that when there is a need to operate the electric auxiliary pump, that pump can provide the necessary volume flow and oil pressure both for the primary circuit, comprising the clutch valve controls, and for the secondary circuit, comprising the cooling and lubrication systems for the transmission components of the transmission.

In the first place the electrically operated auxiliary oil pump supplies the primary circuit with oil; to supply the secondary circuit with oil the operating pressure of the auxiliary oil pump must be increased to above the minimum system pressure, which is as a rule 5.5 bar, so that the primary circuit becomes saturated and the excess oil quantity produced in this way can then flow into the secondary circuit. This results on the one hand in a high electric power uptake by the auxiliary oil pump and on the other hand in severe stressing of the auxiliary oil pump, which can lead to damage thereof since the auxiliary oil pump is not designed to endure prolonged delivery of a pressure in excess of 5.5 bar. Disadvantageously, to design the auxiliary oil pump to withstand this results in higher costs; furthermore, owing to the restricted fitting space available the fitting of an auxiliary oil pump designed to endure a delivery pressure higher than 5.5 bar is often problematic.

From DE 10 2008 040 667 A1 by the present applicant a hybrid system of a transmission device is known, which comprises a main transmission pump that can be driven by a torque transmitted by way of the transmission device and which also has an auxiliary oil pump that can be driven by an electric machine, by means of which a primary pressure circuit and a secondary circuit can be provided with hybrid fluid in an operating condition dependent manner.

In this case a pressure side of the main transmission pump and a pressure side of the auxiliary pump are connected to the primary pressure circuit upstream from a pressure-limiting valve provided in order to set a main pressure of the primary pressure circuit, the pressure-limiting valve being arranged between the pressure sides of the main transmission pump and auxiliary pump and the secondary pressure circuit, while the pressure side of the auxiliary pump can be brought into functional connection with the secondary pressure circuit by way of a hybrid line that bypasses the pressure-limiting valve and can be blocked in the direction toward the primary pressure circuit and the secondary pressure circuit.

SUMMARY OF THE INVENTION

The purpose of the present invention is to indicate a device for ensuring the supply of oil to the secondary circuit of a transmission of a hybrid drive-train of a motor vehicle, which comprises an electrically operated auxiliary oil pump, without having to design the auxiliary oil pump to endure a delivery pressure higher than the system pressure.

According to these a device is proposed for ensuring the supply of oil to the secondary circuit of a transmission of a hybrid drive-train of a motor vehicle, comprising an electrically operated auxiliary oil pump, which comprises a bypass valve connected between the outlet of the auxiliary oil pump and the secondary circuit of the hybrid transmission circuit, such that the bypass valve opens at a predetermined low pressure (the opening pressure), closes at a predetermined pressure (the closing pressure) which is lower than the minimum system pressure, whereas at a predetermined pressure between the opening pressure and the closing pressure the valve admits a predetermined volume flow into the secondary circuit.

The essential concept of the invention ensures that there is no need to increase the operating pressure of the auxiliary oil pump above the minimum system pressure in order to supply the secondary circuit with oil, and this reduces the electric power uptake of the auxiliary oil pump and minimizes the stress upon it.

The bypass valve is preferably in the form of a 2/2-way, spring-loaded proportional valve. Alternatively, the bypass valve can be a 2/2-way magnetic proportional valve.

According to the invention, the bypass valve as a whole can consist of a sleeve, a compression spring, a ball and a socket. Below the opening pressure the ball is pressed by the compression spring of the bypass valve against a valve seat formed by the socket, so that the bypass valve is closed, whereas at pressures higher than the closing pressure the ball of the bypass valve is pressed against a valve seat formed by the sleeve, whereby the bypass valve is again closed. At pressures between the opening pressure and the closing pressure, the axial position of the ball between the two valve seats is determined by the delivery flow of the auxiliary oil pump.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Hybrid circuits of transmissions are very well known to those familiar with the subject, so in the context of the figure descriptions below only components which are relevant to the invention will be shown and explained.

Figure 1:
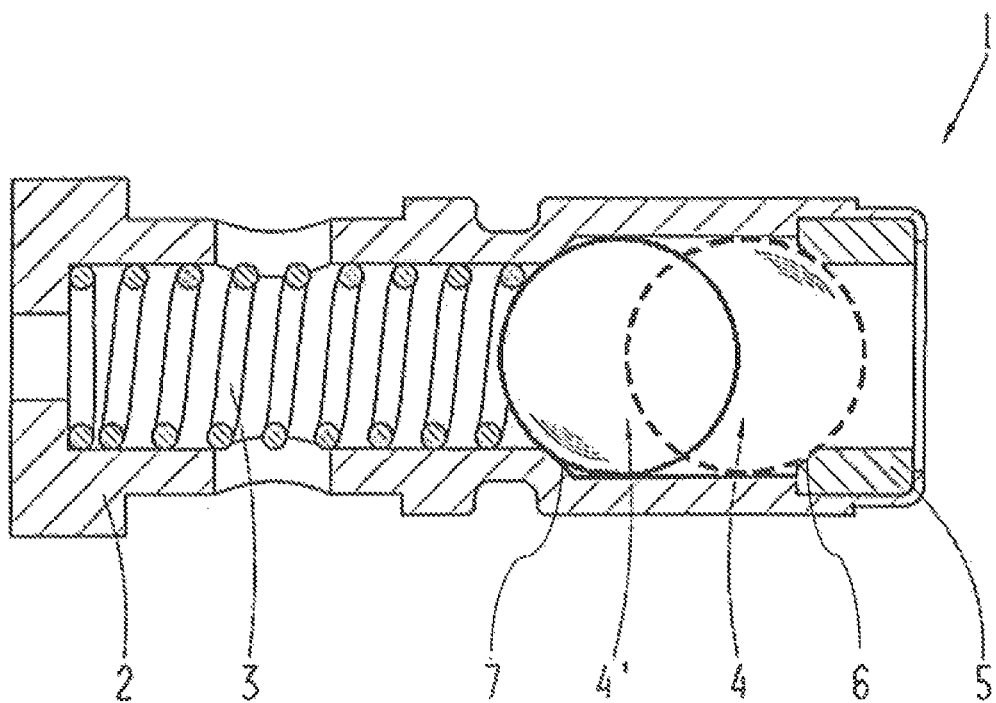
FIGS. 1, 1A, 1B, and 1C: Schematic sectional views of a bypass valve designed in accordance with the invention showing various axial positions for the ball.

According to the invention, and referring to FIG. 1, the device for ensuring the supply of oil to the secondary circuit of a transmission of a hybrid drive-train of a motor vehicle, comprising an electrically operated auxiliary oil pump, comprises a bypass valve 1 connected between the outlet of the auxiliary oil pump and the secondary circuit.

The bypass valve 1 is designed such that at a predetermined, low pressure (the opening pressure) it opens, at a predetermined pressure (the closing pressure) which is lower than the minimum system pressure it closes, and at a predetermined pressure between the opening pressure and the closing pressure it admits a predetermined volume flow into the secondary circuit.

With a system pressure of 5.5 bar the predetermined opening pressure can be for example 1.5 bar while the closing pressure can be 4 bar. In that case, at a pressure of 3 bar a volume flow of 5 l/min is admitted through the bypass valve 1 into the secondary circuit, whereby the supply of oil to the secondary circuit is ensured.

In the event that the pressure rises above the system pressure, the primary circuit is saturated so that the excess oil quantity produced thereby flows into the secondary circuit.

In the example shown in FIG. 1 the bypass valve 1 is in the form of a 2/2-way, spring-loaded proportional valve and consists as a whole of a sleeve 2, a compression spring 3, a ball 4, 4' and a socket 5.

At a pressure lower than the opening pressure of the bypass valve 1 the ball 4 is pressed by the compression spring 3 against a first valve seat 6 formed by the socket 5, whereby the bypass valve 1 is closed; at pressures higher than the closing pressure the ball of the bypass valve 1 is pressed against a second valve seat 7 formed by the sleeve 2, whereby the bypass valve 1 closes.

Figure 1A:
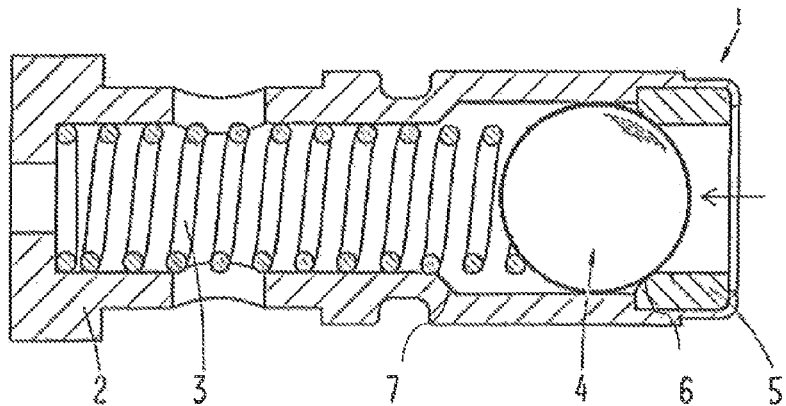
Figure 1B:
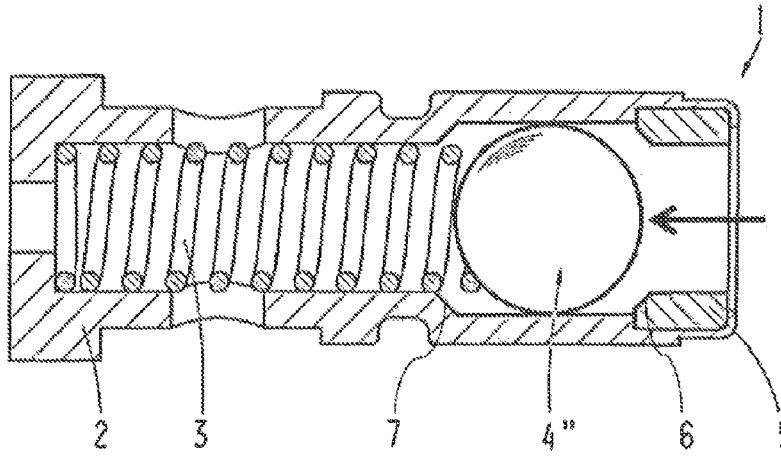
Figure 1C:
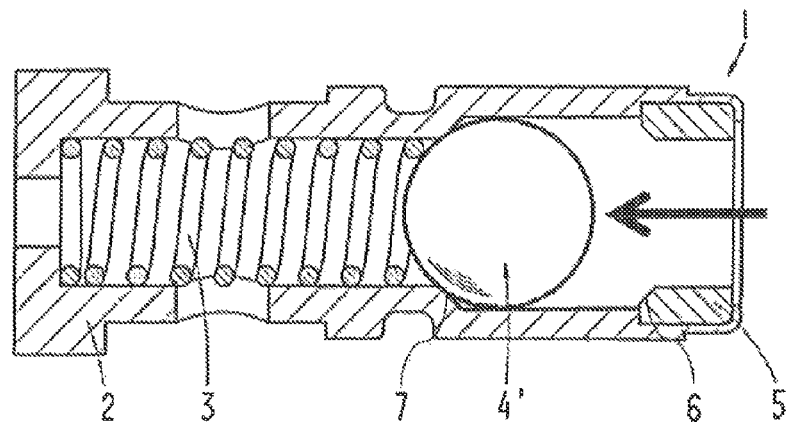

To make clear the two closed positions of the bypass valve 1, when the ball is first pressed against the first valve seat 6 (see FIG. 1A), it is indexed 4, whereas when the ball is pressed closed against the second valve seat 7, it is indexed 4' (see FIGS. 1 and 1C). At pressures between the opening pressure and the second closing pressure, the axial open position 4" of the ball between the two valve seats 6, 7 (see FIG. 1B) is determined by the delivery flow provided by the auxiliary oil pump.

Figure 2:
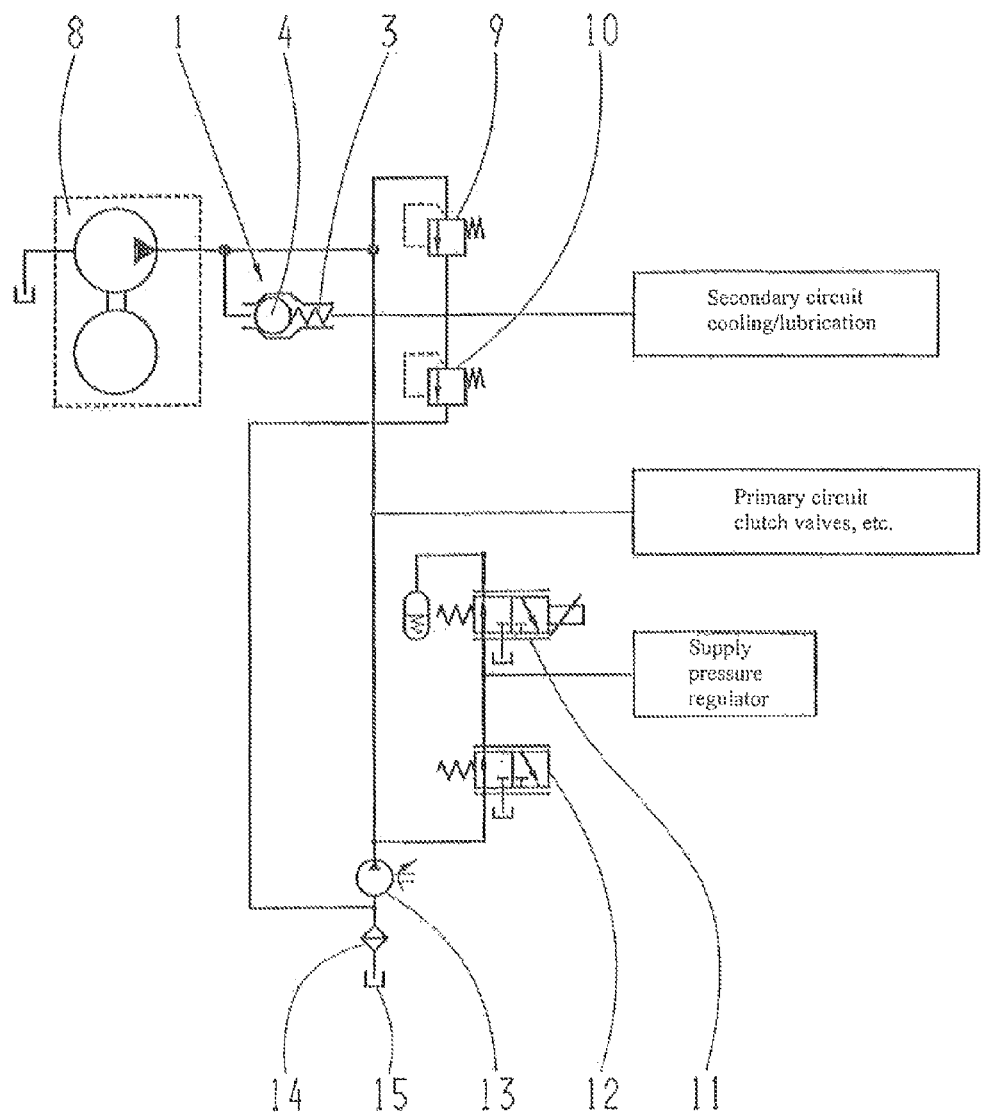
FIG. 2: A diagram to make clear the arrangement of the bypass valve in the hybrid system.

The object of FIG. 2 is the arrangement of the bypass valve 1 provided according to the invention in the oil circuit of the transmission of a hybrid drive-train of a motor vehicle, comprising an electrically operated auxiliary oil pump.

In the example shown in FIG. 2 the electrically operated auxiliary oil pump is indexed 8. As can be seen from FIG. 2, The bypass valve 1 is connected between the outlet of the electrically operated auxiliary oil pump 8 and the secondary circuit.

In addition, in FIG. 2 the system pressure valve is indexed 9, a pressure-limiting valve for the coolant is indexed 10, an electronic pressure control that serves to regulate the pressure for the system pressure valve 9 is indexed 11, and a pressure-reducing valve which reduces the system pressure as a supply pressure for the pressure regulator 11 to a predetermined value, preferably 5.5 bar, is indexed 12. The main oil pump is indexed 13, while a filter is indexed 14 and the oil sump 15.

INDEXES

1 Bypass valve
2 Sleeve
3 Compression spring
4 Ball
4' Ball
5 Socket
6 First valve seat
7 Second valve seat
8 Electrically operated auxiliary oil pump
9 System pressure valve
10 Pressure-limiting valve
11 Pressure regulator
12 Pressure-reducing valve
13 Main oil pump
14 Filter
15 Oil sump

The invention claimed is:

1. A device, for ensuring a supply of oil to a secondary circuit of a transmission of a hybrid drive-train of a motor vehicle, the motor vehicle having an electrically operated auxiliary oil pump (8), and the device comprising:
 a bypass valve (1) connected between an outlet of the auxiliary oil pump (8) and the secondary circuit of the transmission of the hybrid drive-train, wherein the bypass valve:
  remaining closed at a first closing pressure;
  opening at a predetermined opening pressure;
  closing at a predetermined second closing pressure which is greater than the predetermined opening pressure and lower than a minimum system pressure; and
  admitting a predetermined volume flow into the secondary circuit at an at least one predetermined bypass pressure which is a pressure between the opening pressure and the second closing pressure.

2. The device for ensuring the supply of oil to the secondary circuit of the transmission of the hybrid drive-train of a motor vehicle according to claim 1, wherein the bypass valve (1) is a 2/2-way, spring-loaded proportional valve; and
 the auxiliary oil pump pumps fluid which only generates the first closing pressure, the predetermined opening pressure, the predetermined second closing pressure, and a plurality of the predetermined bypass pressures but not the minimum system pressure.

3. The device for ensuring the supply of oil to the secondary circuit of the transmission of the hybrid drive-train of the motor vehicle according to claim 2, wherein the bypass valve (1) comprises:
 a sleeve (2),
 a compression spring (3),
 a ball (4), and
 a socket (5);
 wherein at the first closing pressure, lower than the opening pressure of the bypass valve (1), the ball is pressed by the compression spring (3), against a first valve seat (6) formed by the socket (5), to close the bypass valve (1),
 at pressures higher than the second closing pressure, the ball (4) of the bypass valve (1) is pressed against a second valve seat (7) formed by the sleeve (2), to close the bypass valve (1), and
 at the at least one bypass pressure, between the opening pressure and the second closing pressure, an axial position of the ball (4), between the first and the second valve seats (6, 7), is determined by the delivery flow provided by the auxiliary oil pump (8).

4. The device for ensuring the supply of oil to the secondary circuit of the transmission of the hybrid drive-train of the motor vehicle according to claim 1, wherein the bypass valve (1) is in the form of a 2/2-way magnetic proportional valve.

5. The device for ensuring the supply of oil to the secondary circuit of the transmission of the hybrid drive-train of the motor vehicle according to claim 1, wherein, at a system pressure of 5.5 bar, the predetermined opening pressure is 1.5 bar and the predetermined second closing pressure is 4 bar so that, at the at least one bypass pressure of 3 bar, a volume flow of 5 l/min is admitted into the secondary circuit through the bypass valve (1).

6. The device for ensuring the supply of oil to the secondary circuit of the transmission of the hybrid drive-train of the motor vehicle according to claim 1, wherein, the bypass valve, when experiencing the first closing pressure, is in a first closed position which prevents flow through the bypass valve, and the bypass valve, when experiencing the predetermined second closing pressure, is also in a closed position which prevents flow through the bypass valve.

7. The device for ensuring the supply of oil to the secondary circuit of the transmission of the hybrid drive-train of the motor vehicle according to claim 1, wherein the sleeve (2) has a smaller diameter portion and a larger diameter portion, and the spring is at least partially located within the smaller diameter portion while the ball is located in the larger diameter portion and the second valve seat is located at a transition between the smaller diameter portion and the larger diameter portion.

8. A device, for ensuring a supply of oil to a secondary circuit of a transmission of a hybrid drive-train of a motor vehicle, the motor vehicle having an electrically operated auxiliary oil pump (8), and the device comprising:
    a bypass valve (1) connected between an outlet of the auxiliary oil pump (8) and the secondary circuit of the transmission of the hybrid drive-train, wherein the bypass valve comprising a sleeve accommodating a compression spring, a ball and spaced apart first and second valve seats;
    the ball engaging the first valve seat so as to prevent flow through the bypass valve and remaining closed at or below a first closing pressure;
    the ball being biased away from the first valve seat at a predetermined opening pressure to permit a predetermined volume to flow through the bypass valve at a bypass pressure which is greater than the opening pressure and less than a second closing pressure; and
    the ball engaging the second valve seat so as to prevent flow through the bypass valve and remaining closed at or above the predetermined second closing pressure, which is greater than the predetermined opening pressure but lower than a minimum system pressure.

9. The device for ensuring the supply of oil to the secondary circuit of the transmission of the hybrid drive-train of the motor vehicle according to claim 8, wherein the sleeve has a smaller diameter portion and a larger diameter portion, and the spring is located within the smaller diameter portion while the ball is located in the larger diameter portion and the second valve seat is located at a transition between the smaller diameter portion and the larger diameter portion.

10. An oil supply system, for supplying oil to a secondary hybrid circuit of a transmission of a motor vehicle, the system comprising:
    an electrically operated auxiliary oil pump which supplies a predetermined volume of fluid to be delivered according to the following:
        a predetermined opening pressure being less than at least one flow pressure;
        the at least one flow pressure being less than a predetermined second closing pressure; and
        the predetermined second closing pressure being less than a minimum system pressure;
    a bypass valve being connected between an outlet of the auxiliary oil pump and the secondary hybrid circuit of the transmission for allowing the predetermined volume of oil to flow from the outlet of the auxiliary oil pump into the secondary hybrid circuit, and the bypass valve comprising a sleeve accommodating a compression spring, a ball and spaced apart first and second valve seats;
    wherein the ball is biased, by the compression spring, into a first closed position against the first valve seat at or below a first closing pressure;
        when the opening pressure is applied against the ball, the opening pressure overcomes the bias of the compression spring and opens the bypass valve;
        when the second closing pressure is applied against the ball, the second closing pressure overcomes the bias of the compression spring and forces the ball into a second closed position against the second valve seat thereby closing the bypass valve; and
        when the at the at least one flow pressure is applied against the ball, the ball remaining spaced from both the first and the second valve seats so as to maintain the bypass valve in an open position which permits flow through the bypass valve.

11. The oil supply system for providing supplying oil to the secondary hybrid circuit of the transmission of a motor vehicle according to claim 10, wherein the bypass valve is a 2/2-way, spring-loaded proportional valve.

12. The device for ensuring the supply of oil to the secondary circuit of the transmission of the hybrid drive-train of the motor vehicle according to claim 10, wherein the sleeve has a smaller diameter portion and a larger diameter portion, and the spring is located within the smaller diameter portion while the ball is located in the larger diameter portion and the second valve seat is located at a transition between the smaller diameter portion and the larger diameter portion.

* * * * *